(12) United States Patent
Luo et al.

(10) Patent No.: US 11,594,739 B2
(45) Date of Patent: Feb. 28, 2023

(54) METHOD FOR PREPARING SOFC ANTI-COKING NI-YSZ ANODE MATERIALS

(71) Applicant: Jingdezhen Ceramic Institute, Jiangxi (CN)

(72) Inventors: Linghong Luo, Jiangxi (CN); Liang Cheng, Jiangxi (CN); Xu Xu, Jiangxi (CN); Leying Wang, Jiangxi (CN); Yefan Wu, Jiangxi (CN); Yongzhi Yu, Jiangxi (CN)

(73) Assignee: Jingdezhen Ceramic Institute, Jingdezhen (CN)

( * ) Notice: Subject to any disclaimer, the term of this patent is extended or adjusted under 35 U.S.C. 154(b) by 257 days.

(21) Appl. No.: 16/937,588

(22) Filed: Jul. 24, 2020

(65) Prior Publication Data

US 2021/0005898 A1    Jan. 7, 2021

Related U.S. Application Data

(63) Continuation-in-part of application No. PCT/CN2019/083023, filed on Apr. 17, 2019.

(51) Int. Cl.
H01M 8/12 (2016.01)
H01M 4/90 (2006.01)
(Continued)

(52) U.S. Cl.
CPC ....... H01M 4/9066 (2013.01); H01M 4/8652 (2013.01); H01M 4/9033 (2013.01);
(Continued)

(58) Field of Classification Search
CPC .... H01M 4/9066; H01M 4/8652; H01M 8/12; H01M 8/1213; H01M 8/124; H01M 8/1253; H01M 2008/128
See application file for complete search history.

(56) References Cited

U.S. PATENT DOCUMENTS 5,656,387 A * 8/1997 Barnett ................. C23C 14/083
429/535
6,692,855 B1 * 2/2004 Aizawa ............... H01M 4/9066
429/479
(Continued)

FOREIGN PATENT DOCUMENTS

JP          09227212 A *  9/1997  .......... H01M 4/9066

*Primary Examiner* — Jeremiah R Smith (57) ABSTRACT

The present disclosure relates to the field of materials, and in particular, to a method for preparing anti-coking Ni-YSZ anode materials for SOFC. The present disclosure provides a method for preparing a SOFC anode material, including: (1) providing the mixed powder of NiO and YSZ; (2) subjecting the mixed powder provided in step (1) to two-phase mutual solid solution treatment; (3) adjusting the particle size of the product obtained in the solid solution treatment in step (2). The SOFC anode material provided by the present disclosure could prepare the SOFC anode with good carbon deposition resistance. The anode material as a whole has the advantages of low cost, good catalytic performance, desirable electronic conductivity and well chemical compatibility with YSZ, etc. The long-term stability of cell performance is strong, and the cell preparation method is also easy to achieve industrialization.

11 Claims, 6 Drawing Sheets

(51) Int. Cl.
*H01M 4/86*     (2006.01)
*H01M 8/1253*   (2016.01)
*H01M 8/1213*   (2016.01)
*H01M 8/124*    (2016.01)

(52) U.S. Cl.
CPC ............ *H01M 8/12* (2013.01); *H01M 8/124* (2013.01); *H01M 8/1213* (2013.01); *H01M 8/1253* (2013.01); *H01M 2004/8684* (2013.01); *H01M 2008/128* (2013.01); *H01M 2008/1293* (2013.01)

(56) References Cited

U.S. PATENT DOCUMENTS

| | | | |
|---|---|---|---|
| 2003/0027033 A1* | 2/2003 | Seabaugh | H01M 4/8621 264/618 |
| 2003/0118879 A1* | 6/2003 | Barnett | H01M 8/126 429/495 |
| 2007/0015045 A1* | 1/2007 | Lee | H01M 4/8652 429/496 |
| 2012/0003565 A1* | 1/2012 | Son | H01M 4/861 429/491 |
| 2012/0129068 A1* | 5/2012 | Narendar | H01M 8/124 156/308.2 |
| 2013/0093128 A1* | 4/2013 | Kim | B82Y 30/00 264/618 |
| 2018/0241063 A1* | 8/2018 | Brodersen | H01M 8/0271 |

\* cited by examiner

METHOD FOR PREPARING SOFC ANTI-COKING NI-YSZ ANODE MATERIALS

CROSS REFERENCE TO RELATED APPLICATIONS

This is a continuation-in-part application claiming priority to a PCT International Application No. PCT/CN2019/083023, filed on Apr. 17, 2019, which claims the benefit of priority to Chinese Patent Application No. CN 2019102388052, entitled "Method for Preparing SOFC anti-coking Ni-YSZ anode materials", filed with CNIPA on Mar. 27, 2019, the content of which is incorporated herein by reference in its entirety.

TECHNICAL FIELD

The present disclosure relates to the field of solid oxide fuel cell (SOFC), and in particular, to a method for preparing SOFC anti-coking Ni-YSZ anode materials.

BACKGROUND

Solid oxide fuel cell (SOFC) is a power generation method that directly converts chemical energy in fuel and oxygen into electricity without burning. There is no need to follow the Carnot cycle. The conversion efficiency is high, and the total efficiency of the cogeneration efficiency may exceed 80%. The products of the electrochemical reaction are hot water and carbon dioxide. Due to the high concentration of carbon dioxide to be easily recycled, the products of power generation are clean. Therefore, SOFC is an efficient and green power generation method. Commercially, the intermediate-temperature solid oxide fuel cell (IT-SOFC) as the second-generation cell operates at about 750° C. The first-generation cell is electrolyte-supported and belongs to the high-temperature solid oxide fuel cell, of which the operating temperature is more than 850° C. IT-SOFC generally adopts the anode-supported cell structure with electrolyte film. The major obstacle to the commercialization of IT-SOFC is the carbon deposition of cell anodes. When operating at about 750° C. under hydrocarbon fuels, carbon deposition will be easily observed during the operation of traditional Ni-YSZ anodes (mixed porous metal ceramics of metal nickel and yttria-stabilized zirconia), which would result in the rapid degradation of cell performance. It will be necessary to make various modification or doping for traditional Ni-YSZ to improve its carbon deposition resistance, or use reformed hydrocarbon fuels. However, the former would greatly increase the manufacturing cost of the cells or bring the poor long-term stability of the cells, and the latter would make it inconvenient for using and then result in other problems. In addition, due to the lack of other better anode catalysts to replace Ni, the commercial SOFC still use traditional Ni-YSZ as anodes. Therefore, it's a key problem to improve the anti-coking tolerance of traditional Ni-YSZ anodes, which needs to be urgently solved in the commercialization of SOFC.

SUMMARY

In view of the shortcomings of the existing technology described above, the object of the present disclosure is to provide a method for preparing SOFC anode materials, and further provide the SOFC anode materials prepared by the preparation method and their applications, which are used to solve the problems in the existing technology.

In one aspect, the present disclosure provides a method for preparing SOFC anode materials, including:

(1) providing the mixed powder of NiO and YSZ;

(2) subjecting the mixed powder provided in step (1) to the two-phase mutual solid solution treatment;

(3) adjusting a particle size of the product obtained in the solid solution treatment in step (2).

In some embodiments of the present disclosure, in the step (1), a specific method for providing a mixed powder of NiO and YSZ is pulverizing and mixing NiO and YSZ.

In some embodiments of the present disclosure, in the step (1), the weight ratio of NiO and YSZ is 1~1.8:1.

In some embodiments of the present disclosure, in the step (1), when the SOFC anode material is used for the anode supporting layer, the YSZ powder is 3~8 mol. % $Y_2O_3$ doped zirconia, the crystallite size of the NiO raw material is 5~20 nm, and the particle size of YSZ raw material is $D_{50}$=0.2~1.0 µm.

In some embodiments of the present disclosure, in the step (1), when the SOFC anode material is used for the anode functional layer, the YSZ powder is 7~9 mol. % $Y_2O_3$ doped zirconia, and the crystallite size of the NiO raw material is 5~20 nm, and the particle size of YSZ raw material is $D_{50}$=50~100 nm.

In some embodiments of the present disclosure, in the step (1), the particle size of the YSZ particles in the mixed powder is 50~1000 nm, and the crystallite size of the NiO powder is 10~20 nm.

In some embodiments of the present disclosure, in the step (1), NiO and YSZ are pulverized and mixed by ball-milling. The ball-milling is preferably a wet ball-milling. The powder obtained by ball-milling is further dried, and the drying temperature may be 60~80° C.

In some embodiments of the present disclosure, in the step (1), the pulverization and mixing are performed in the presence of some dispersants. The dispersants are preferably selected from a group consisting of triethanolamine, citric acid, polyethylene glycol, acetylacetone, polyvinylpyrrolidone and polyacrylic acid, or combinations thereof. The weight ratio of the powder and the dispersant is 1:0.005~0.1, and preferably 1:0.02~0.05.

In some embodiments of the present disclosure, in the step (1), the pulverization and mixing are performed in the presence of some solvents. The solvents are preferably selected from a group consisting of anhydrous ethanol, acetone, butanone, isopropyl alcohol and dimethylformamide, or combinations thereof. The weight ratio of the powder and the solvent is 1:0.2~1.5, and preferably 1:0.4~0.8.

In some embodiments of the present disclosure, in the step (2), the specific method for subjecting the mixed powder provided in the step (1) to two-phase mutual solid solution treatment is drying and calcining the mixed powder provided in the step (1).

In some embodiments of the present disclosure, in the step (2), the calcination temperature is 600~1200° C., preferably 800~950° C.

In some embodiments of the present disclosure, in the step (2), the calcination time is 1~10 hours, preferably 2~8 hours.

In some embodiments of the present disclosure, in the step (3), the specific method for adjusting the particle size of the product obtained in the solid solution treatment in the step (2) is pulverizing and drying the calcined product provided in the step (2). Preferably, the calcined product is pulverized by ball-milling.

In another aspect, the present disclosure provides a SOFC anode material prepared by such a preparation method.

In another aspect, the present disclosure provides a SOFC single cell, which includes an anode material layer, an electrolyte layer and a cathode material layer. The anode material layer is prepared from the above SOFC anode material.

In some embodiments of the present disclosure, the anode material layer includes an anode supporting layer and/or an anode functional layer. The anode supporting layer and/or the anode functional layer are prepared from the above SOFC anode material.

In some embodiments of the present disclosure, the thickness of the anode supporting layer is 300~700 μm, preferably 400~500 μm; the pore size is 3~10 μm, and the porosity of the anode supporting layer after reduction is 25~40 vol. %, preferably 30~35 vol. %. The thickness of the anode functional layer is 5~30 μm, preferably 5~10 μm; the pore size is 1~5 μm, and the porosity of the anode functional layer after reduction is 25~40 vol. %, preferably 30~35 vol. %.

In some embodiments of the present disclosure, the electrolyte layer is selected from a YSZ electrolyte layer, and the thickness of the electrolyte layer is 2~10 μm.

In some embodiments of the present disclosure, the cathode material layer is selected from a combination of LSM and YSZ or a combination of LSM and SSZ with a weight ratio of 5~7:5~3, or a combination of LSCF and GDC with a weight ratio of 5~7:5~3.

In some embodiments of the present disclosure, the thickness of the cathode material layer is 20~40 μm, preferably 20~25 μm. The cathode material layer has a porous structure, and the porosity is 25~40 vol. %, preferably 30~35 vol. %.

In another aspect, the present disclosure provides an anode-reduced SOFC single cell, which is obtained from the SOFC single cell after reduction treatment and/or discharge treatment.

DETAILED DESCRIPTION OF THE PREFERRED EMBODIMENTS

Through a large number of studies, the inventors of the present disclosure have discovered that, a new kind of SOFC anode material could be provided by using a suitable method to pulverize, mix, and further calcine NiO and YSZ. The SOFC anode material could be used to prepare a SOFC single cell, and the anode to obtain the SOFC single cell holds the excellent anti-coking tolerance. The present disclosure is completed on this basis.

The first aspect of the present disclosure provides a method for preparing a SOFC anode material, including:
(1) providing the mixed powder of NiO and YSZ;
(2) subjecting the mixed powder provided in step (1) to solid solution treatment,
(3) adjusting a particle size of the product obtained in the solid solution treatment in step (2).

Figure 1:
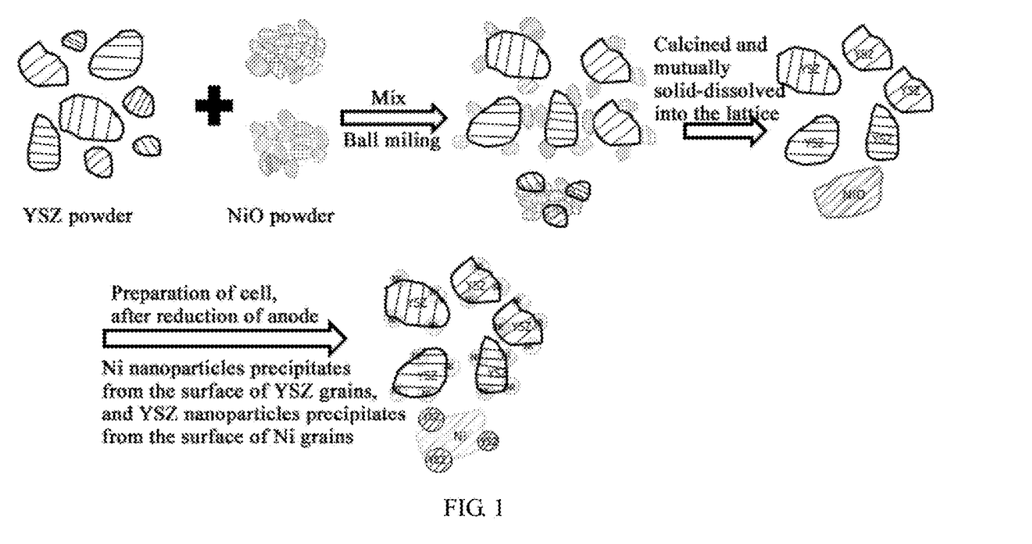
FIG. 1 is the schematic diagram showing the preparation process of the anti-coking Ni-YSZ anode material for SOFC.

The method for preparing the SOFC anode material provided by the present disclosure may include: providing a mixed powder of NiO and YSZ, so as to uniformly mix the two phases of NiO and YSZ powder particles and reduce the particle size of the powder. The raw materials of the anode material may include NiO and YSZ. The two oxides are sufficiently pulverized and mixed to obtain a mixture of sub-micron YSZ particles and nanocrystalline NiO powder. As shown in FIG. 1, two kinds of powders with different particle diameters are mixed by ball-milling, and the two following basic situations would appear: firstly, nanometer-sized NiO particles are adsorbed on the surface of sub-micron YSZ particles; secondly, a small amount of nano-scale YSZ particles are adsorbed around the agglomerates of the NiO powder. In the obtained mixed powder, the particle size of the YSZ particles is usually 50~1000, 50~100, 100~200, 200~300, 300~500 or 500~1000 nm. The crystallite size of the NiO powder could be obtained by the XRD test and calculated using the Scherrer formula, the same applies hereinafter, which may be 10~20, 10~15 or 15~20 nm. Those skilled in the art may select a suitable method to provide a mixed powder of NiO and YSZ. For example, NiO and YSZ may be pulverized and mixed. More specifically, a method of pulverizing and mixing NiO and YSZ should be known to those skilled in the art. For example, methods including ball-milling (such as wet ball-milling) may be used to pulverize and mix NiO and YSZ. In the preparation process, pulverization and mixing may be performed in the presence of dispersants and/or solvents, such that the NiO powder and the YSZ powder could be uniformly mixed. For example, the dispersants could be selected from a group consisting of triethanolamine, citric acid, polyethylene glycol, acetylacetone, polyvinylpyrrolidone and polyacrylic acid, or combinations thereof. The weight ratio of powder and dispersant may be 1:0.005~0.1, 1:0.005~0.01, 1:0.01~0.02, 1:0.02~0.03, 1:0.03~0.04, 1:0.04~0.05 or 1:0.05~0.1, preferably 1:0.02~0.05. Further, the solvents may be selected from consisting of anhydrous ethanol, acetone, butanone, isopropyl alcohol and dimethylformamide. The weight ratio of powder and solvent may be 1:0.2~1.5, 1:0.2~0.4, 1:0.4~0.6, 1:0.6~0.8, 1:0.8~1.0, 1:1.0~1.2 or 1:1.2~1.5, preferably 1:0.4~0.8. Further, a zirconia ball may be used in the ball milling preparation process. The weight ratio of powder and zirconia ball may be 1:1.5~2.0, 1:1.5~1.6, 1:1.6~1.8 or 1:1.8~2.0, and the diameter of zirconia balls may be 0.3~0.8, 0.3~0.4, 0.4~0.5, 0.5~0.6, 0.6~0.7 or 0.7~0.8 mm. Further, the powder obtained by ball-milling may also be subject to drying, and the drying temperature may be 60~80, 60~65, 65~70, 70~75 or 75~80° C. The SOFC anode material may be used to prepare an anode material layer, and more specifically, it may be used to prepare an anode supporting layer and/or an anode functional layer. An anode functional layer is a place where the electrochemical reaction of the anode is completed; the role of the anode supporting layer is to support the entire cell and conduct electrons. Generally speaking, the anode supporting layer is relatively thicker and has the higher mechanical strength than the anode functional layer. The properties of the SOFC anode material and the anode material layer obtained by the preparation mainly depend on these parameters, such as the mixing ratio of NiO and YSZ, the content and/or stability of $Y_2O_3$ in YSZ and the particle size of the raw material powders. For example, the weight ratio of NiO and YSZ may be 1~1.8:1, 1~1.2:1, 1.2~1.4:1, 1.4~1.6:1 or 1.6~1.8:1. In a specific embodiment of the present disclosure, when the SOFC anode material is used for an anode supporting material, the weight ratio of NiO and YSZ is 1~1.8:1, 1~1.2:1, 1.2~1.4:1, 1.4~1.6:1 or 1.6~1.8:1, YSZ powder may be 3~8 mol. % $Y_2O_3$ doped zirconia, 3~4 mol. % $Y_2O_3$ doped zirconia, 4~5 mol. % $Y_2O_3$ doped zirconia, 5~6 mol. % $Y_2O_3$ doped zirconia, 6~7 mol. % $Y_2O_3$ doped zirconia or 7~8 mol. % $Y_2O_3$ doped zirconia (The expression pattern of YSZ material should be well known to the skilled in the art, for example, 5 mol. % $Y_2O_3$ doped zirconia means a YSZ material formed by 5 mol. % $Y_2O_3$+95 mol. % $ZrO_2$ through solid solution treatment, and may also be represented as 5YSZ; due to the solid solution of appropriate amount of $Y_2O_3$ in the crystal lattice, the phase transition of the zirconia is partially stabilized; as the temperature changes, the zirconia undergoes only a partial phase transition), the crystallite size of NiO raw materials may be 5~20, 5~10, 10~15 or 15~20 nm, the particle size of YSZ raw material may be $D_{50}$=0.2~1.0, 0.2~0.4, 0.4~0.6, 0.6~0.8 or 0.8~1.0 μm. In another specific embodiment of the present disclosure, when the SOFC anode material is used for an anode functional layer material, the weight ratio of NiO and YSZ is 1~1.8:1, 1~1.2:1, 1.2~1.4:1, 1.4~1.6:1 or 1.6~1.8:1, the YSZ powder may be 79 mol. % $Y_2O_3$ doped zirconia, 7~7.5 mol. % $Y_2O_3$ doped zirconia, 7.5~8 mol. % $Y_2O_3$ doped zirconia, 8~8.5 mol. % $Y_2O_3$ doped zirconia or 8.5~9 mol. % $Y_2O_3$ doped zirconia (the $Y_2O_3$ solid-dissolved in the crystal lattice can usually reach up to about 8 mol. %. The phase transition of zirconia is basically stabilized at this ratio, no phase transition of the zirconia occurs as the temperature changes); the crystallite size of NiO raw materials may be 5~20, 5~10, 10~15 or 15~20 nm; the particle size of YSZ raw materials may be $D_{50}$=50~100, 50~60, 60~70, 70~80, 80~90 or 90~100 nm.

The method for preparing a SOFC anode material provided by the present disclosure may include: subjecting the mixed powder provided in the step (1) to two-phase mutual solid solution treatment. In the present disclosure, the so-called two-phase mutual solid solution treatment generally refers to a treatment method in which NiO nanoparticles adsorbed around the YSZ particles are solid-dissolved into the YSZ lattice to form a solid solution, and YSZ nanoparticles adsorbed around the NiO particles are solid-dissolved into the NiO lattice to form a solid solution. A specific method for subjecting the mixed powder provided in the step (1) to two-phase mutual solution treatment may be: drying and calcining the mixed powder provided in the step (1). The inventors of the present disclosure discovered that during the calcination process, the powder would be mutually solid-dissolved. Due to the small crystal grains and high activity, the NiO particles are easily solid-dissolved into the surface of YSZ particles during the calcination process, which is that nano-NiO enters into the interior of YSZ particle lattice to form a solid solution. At the same time, it is also found that YSZ with small grain size may also be solid-dissolved into the larger NiO particles during the calcination process, which is that nano-YSZ enters into the interior of the NiO particle lattice to form a solid solution. The surface of the calcined powder is smooth, and there is usually no obvious nano-protrusions on the surface of the particles. The calcination temperature may be 600~1200, 600~800, 800~850, 850~900, 900~950, 950~1000 or 1000~1200° C., preferably 800~950° C. The calcination time may be 1~10, 1~2, 2~4, 4~6, 6~8 or 8~10 hours, preferably 2~8 hours. The calcining time is specifically the holding time of the product at the calcination temperature.

The method for preparing a SOFC anode material provided by the present disclosure may include: adjusting the particle size of the product obtained in the solid solution treatment in the step (2), so as to reduce the particle size of the NiO-YSZ mixed powder grown by calcination. The particle size adjustment generally refers to a method of adjusting the particle size of powder to a target size using an appropriate physical method. A specific method for adjusting the particle size of the product obtained by the solution treatment in the step (2) may be: pulverizing and drying the calcined product provided in the step (2). After calcination, the powder particles may increase to some extent. Powder particles with suitable particle size could be obtained after pulverizing. For example, the particle size of the calcined product after pulverizing may be 0.1~1.1, 0.1~0.3, 0.3~0.5, 0.5~0.8 or 0.8~1.1 μm, $D_{50}$=0.190 μm. After the further drying, the system almost contains no solvent, and the powder that may be used for a SOFC anode material is obtained. Further, for example, a zirconia ball may be used in the ball-milling preparation process. The weight ratio of powder and zirconia ball may be 1:1.5~2.0, 1:1.5~1.6, 1:1.6~1.8 or 1:1.8~2.0. A method for pulverizing the calcined product should be known to the skilled in the art. For example, the calcined product may be pulverized by a method such as ball-milling.

A second aspect of the present disclosure provides a SOFC anode material, which is obtained by the method for preparing a SOFC anode material provided by the first aspect of the present disclosure.

A third aspect of the present disclosure provides the use of the SOFC anode material provided by the second aspect of the present disclosure as a SOFC anode material. The SOFC anode material may be used to prepare a SOFC anode material layer. For example, the SOFC anode material layer may include an anode supporting layer and/or an anode functional layer, etc. The SOFC anode material layer prepared by using the SOFC anode material has excellent anti-coking properties.

A fourth aspect of the present disclosure provides a SOFC anode material layer prepared from the SOFC anode material provided in the second aspect of the present disclosure. The SOFC anode material layer may include an anode supporting layer and/or an anode functional layer. The skilled in the art may select a suitable method to prepare a SOFC anode material layer from the SOFC anode material. For example, it may be formed by tape-casting or other methods. For another example, in the formed anode material layer, the thickness of the anode supporting layer may be 300~700 μm, preferably 400~500 μm; the pores of the anode support layer are relatively large, and the pore size may be 3~10, 3~5, 5~7 or 7~10 μm; after reduction, the porosity of the anode support layer may be 25~40, 25~30, 30~35 or 35~40 vol. %, preferably 30~35 vol. %. For another example, the thickness of the anode functional layer may be 5~30, 5~10, 10~20 or 20~30 μm, preferably 5~10 μm; the pores of the anode functional layer are relatively small, and the pore size may be 1~5, 1~2, 2~3, 3~4 or 4~5 μm; after reduction, the porosity of the anode functional layer may be 25~40, 25~30, 30~35 or 35~40 vol. %, preferably 30~35 vol. %.

A fifth aspect of the present disclosure provides a SOFC single cell, including the anode material layer, the electrolyte layer and the cathode material layer provided by the third aspect of the present disclosure. The basic structure of the SOFC single cell should be known to the skilled in the art. For example, in the SOFC single cell, the anode material layer, the electrolyte layer and the cathode material layer may usually be sequentially stacked. The anode material layer and the cathode material layer may be located on each side of the electrolyte layer, respectively. The electrolyte layer and the cathode material layer may be selected from various related materials suitable for constructing SOFC single cells in the field. In a specific embodiment of the present disclosure, the electrolyte layer is selected from a YSZ electrolyte layer, and more specifically, an 8YSZ electrolyte layer. The electrolyte layer may have a thickness of 2~10, 2~4, 4~6, 6~8 or 8~10 μm. The electrolyte layer is usually a dense and thin layer. In another specific embodiment of the present disclosure, the cathode material layer is selected from a combination of LSM (the general formula of which may be $La_{1-x}Sr_xMnO_3$, x=0.1~0.9) and YSZ or a combination of LSM and SSZ, wherein the weight ratio of LSM and YSZ or SSZ is 5~7:5~3, a combination of LSCF (the general formula of which may be $La_{1-x}Sr_xCo_{1-y}Fe_yO_{3-\delta}$, x=0.1~0.9; y=0.1~0.9) and GDC (for example, $Ce_{0.9}Gd_{0.1}O_{1.95}$, $Ce_{0.8}Gd_{0.2}O_{1.9}$), wherein the weight ratio of LSCF and GDC may be 5~7:5~3. When the combination of LSCF and GDC is used as the cathode, the SOFC single cell usually further includes an interlayer, which may be located on the YSZ electrolyte layer. The thickness of the interlayer layer may be 1~3, 1~1.5, 1.5~2, 2~2.5 or 2.5~3 μm, to prevent YSZ and LSCF from reacting to form a second phase at high temperature, and at the same time, to make the expansion coefficient of GDC better match the LSCF-GDC cathode. The thickness of the cathode material layer may be 20~40, 20~25, 25~30, 30~35 or 35~40 μm. The cathode material layer has a porous structure, the porosity thereof may be 25~40, 25~30, 30~35 or 35~40 vol. %. The person skilled in the art may select a suitable method for preparing the SOFC single cell. For example, an anode material layer (including an anode supporting layer and/or an anode functional layer) and an electrolyte layer may be sequentially laminated, hot-pressed and sintered (the sintering temperature may be 1350~1450° C., and the holding time may be 3~6 hours) to obtain a half-cell. A cathode material (usually in the form of slurry) is further formed (e.g., brushing, screen printing, etc.) on the obtained half-cell. A full single cell may be obtained after calcination. In a specific embodiment of the present disclosure, the hot-pressing temperature may be 50~150° C., the hot-pressing time may be 5~40 min, the pressure may be 5~30 MPa, and the calcination temperature may be 1050~1250, 1050~1100, 1100~1150, 1150~1200 or 1200~1250° C.

A sixth aspect of the present disclosure provides an anode-reduced SOFC single cell, which is obtained from the SOFC single cell provided by the fourth aspect of the present disclosure after reduction treatment and/or discharging treatment. The SOFC single cell provided by the fourth aspect of the present disclosure usually requires an anode reduction before cell operating. The skilled in the art may select a suitable method for anode reduction of the SOFC single cell. For example, the reduction may be performed in a hydrogen atmosphere with a reduction temperature of 650~950° C. for 1~6, 1~2, 2~4 or 4~6 hours. The purpose of anode reduction is to reduce NiO to metallic Ni and make the anode become the porous cermet Ni-YSZ. In order to further precipitate more nanocrystal grains on the sub-micron particles, the single cell could further perform discharging. The skilled in the art may select a suitable method to discharge the SOFC single cell. For example, the discharging may be performed at 650~750° C. with 97 vol. % $H_2$+3 vol. % $H_2O$ as fuel and air as the oxidant for 4~8 hours under the discharging voltage of 0.6~0.8 V. As shown in FIG. 1, due to the reduction of NiO to Ni, the solid-dissolved NiO in YSZ particles no longer match the lattice parameter, leading to the precipitation of nano-Ni particles on the surface of YSZ particles. In addition, the solid-dissolved YSZ in NiO particles no longer match the lattice parameter, leading to the precipitation of nano-YSZ particles on the surface of Ni particles. Being that the anode has the above-mentioned structure; the anode holds good carbon deposition resistance.

During the operation of the SOFC single cell provided by the present disclosure, the cathode of the cell is in contact with air, and the anode is in contact with fuel gas. The oxygen on the cathode is dissociated into oxygen atoms after being adsorbed. The oxygen atoms obtain electrons from the external circuit of the cathode, and then converted into oxygen ions. The oxygen ions diffuse from the sintered dense electrolyte layer to the anode functional layer through the lattice diffusion. The anode functional layer contains fuel gases, including hydrocarbon fuels such as methane and ethanol. The hydrocarbon fuels may undergo cracking reaction on the Ni of the anode to produce the products such as H, CO and $CO_2$, and then perform the electrochemical reactions in this layer: $O^{2-}+2H=H_2O+2e$; $O^{2-}+CO=CO_2+2e$; $2O^{2-}+C=CO_2+4e$. The products of the electrochemical reaction are water and carbon dioxide, and the electrons obtained are transferred from the anode. The traditional Ni anodes would easily deposit carbon during the process of cracking hydrocarbon fuels by Ni, and then cause the cell performance to rapidly decline. The basic process of carbon deposition is as follows: take the cracking of $CH_4$ by Ni as an example, $CH_4=C+CH_3$, $CH_3=C+CH_2$, $CH_2=C+CH$, $CH=C+H$. Carbon atoms adsorbed on Ni may migrate in the Ni crystal lattice, and mainly deposited on the (111) crystal plane of Ni as a template. Finally, various carbon materials such as graphite carbon, carbon fiber, hollow carbon nanotube and amorphous carbon may be formed. Ni is a face-centered cubic structure with the closest packing, and the atomic arrangement of the (111) crystal plane is a uniform and symmetrical arrangement, which is exactly a template for carbon deposition. However, for the method for preparing the SOFC anode material and the SOFC single cell obtained by the present disclosure, due to the mutual solid solution, after the anode is reduced at a certain temperature, the NiO solid-dissolved on the surface of the YSZ grains would be in-situ reduced and precipitated into nano Ni metal particles; similarly, due to that the NiO grains would be reduced to Ni metal, the YSZ solid-dissolved on the surface of NiO grains would precipitate the YSZ that does not match the lattice, making them into the nano-YSZ grains on the surface of NiO. The massive nano-Ni particles precipitated from the surface of the YSZ grains not only hold the strong catalytic cracking ability for hydrocarbon fuels, but also have the excellent resistance to carbon deposition. The fuel molecules such as $CH_4$ and ethanol entering the anode do not need to be cracked on the large-grained Ni in the anode, which would be preferentially cracked at these massive nano-Ni particles. At this point, the large-grained Ni in the anode is the main phase in the anode and connects with each other, which could act as the electron conduction. In addition, a few YSZ nanoparticles would be also precipitated on the surface of some large-grained Ni in the anode. Due to the strong interaction between these precipitated nano-YSZ particles and Ni particles, the large Ni particles have the ability to resist carbon deposition, which endow the anode resistance to carbon deposition, which is the phenomenon that carbon deposition would not occur when the hydrocarbon fuel is cracked on Ni.

There are some oxygen vacancies in the lattice of YSZ, which would absorb and split the environmental water to form the hydroxyl radical. The related reactions are as follows:

$$Y_2O_3 \xrightarrow{ZrO_2} 2Y'_{Zr} + V''_O + \frac{3}{2}O_2$$

$$H_2O(g) + V''_O + O^x_O \rightarrow 2OH^\cdot_O$$

The OH adsorbed on YSZ would be combined with the C atoms adsorbed on Ni to form COH adsorbed on Ni. The catalytic reaction equations of the anode supporting layer for eliminating carbon deposition are as follows:

Anode Supporting Layer:

$C(Ni)+OH(YSZ)=COH(Ni)$ $COH(Ni)=CO(Ni)+H(Ni)$ $CO(Ni)+OH(YSZ)=COOH(Ni)+YSZ$ $COOH(Ni)+OH(YSZ)=CO_2+H_2O$

Total reaction formula: $C(Ni)+3H_2O(YSZ)=CO_2+H_2O+2H_2$

For the anode functional layer, the anti-carbon deposition catalytic reaction involves the participation of oxygen ions that are continuously migrated from the electrolyte to the anode functional layer, so the carbon oxide reaction has some different reaction mechanisms from the anode supporting layer above. The main difference is that CO and H adsorbed on Ni would migrate from Ni to the three-phase boundary (TPB) on the anode functional layer, and then react with the oxygen ions diffused from the electrolyte. The catalytic reaction equations of the anode functional layer for eliminating carbon deposition are as follows:

$C(Ni)+OH(YSZ)=COH(Ni)$ $COH(Ni)=CO(Ni)+H(Ni)$ $CO(Ni)\rightarrow CO(tpb); H(Ni)\rightarrow H(tpb)$ $CO(tpb)+O^{2-}=CO_2+2e; 2H(tpb)+O^{2-}=H_2O+4e$ Total reaction formula: $C(Ni)+H_2O(YSZ)+2O^{2-}=CO_2+H_2O+4e$ The related embodiments of the present disclosure further verify the carbon deposition resistance of the SOFC single cell. In the experiments, no carbon deposition is observed on large-grained Ni in the anode (including the anode supporting layer and the anode functional layer).

The anode of the SOFC anode material provided by the present disclosure and the SOFC single cell prepared therefrom possesses good carbon deposition resistance. The anode material as a whole has the advantages of low cost, good catalytic performance, desirable electronic conductivity and well chemical compatibility with YSZ, etc. The long-term stability of cell performance is strong, and the cell preparation method is also easy to achieve industrialization.

The embodiments of the present disclosure will be described through exemplary embodiments below. Those skilled in the art can easily understand other advantages and effects of the present disclosure according to contents disclosed by the specification. The present disclosure can also be implemented or applied through other different exemplary embodiments. Various modifications or changes can also be made to all details in the specification based on different views and applications without departing from the spirit of the present disclosure.

It should be noted that processing equipment or devices not specifically noted in the following embodiments are all conventional equipment or devices in the field.

In addition, it should be understood that one or more method steps mentioned in the present disclosure are not exclusive of other method steps that may exist before or after the combined steps or that other method steps may be inserted between these explicitly mentioned steps, unless otherwise stated; it should also be understood that the combined connection relationship between one or more equipment/devices mentioned in the present disclosure does not exclude that there may be other equipment/devices before or after the combined equipment/devices or that other equipment/devices may be inserted between these explicitly mentioned equipment/devices, unless otherwise stated. Moreover, unless otherwise stated, the numbering of each method step is only a convenient tool for identifying each method step, and is not intended to limit the order of each method step or to limit the scope of the present disclosure. The change or adjustment of the relative relationship shall also be regarded as the scope in which the present disclosure may be implemented without substantially changing the technical content.

Embodiment 1

Figure 7:
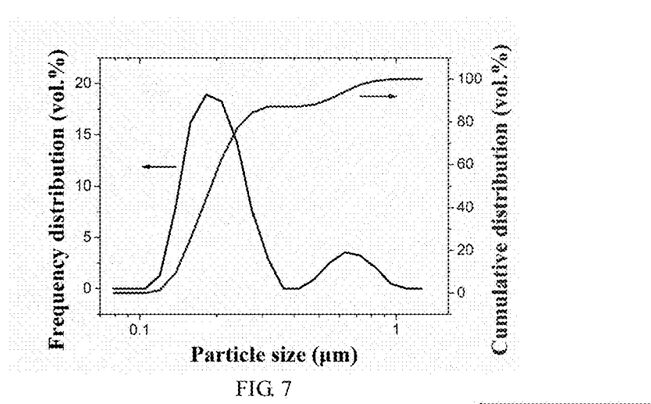
FIG. 7 are the particle size distribution curves of the NiO-5YSZ powder after ball-milling, calcining and again ball-milling, which is used to prepare the anode supporting layer.
Figure 8:
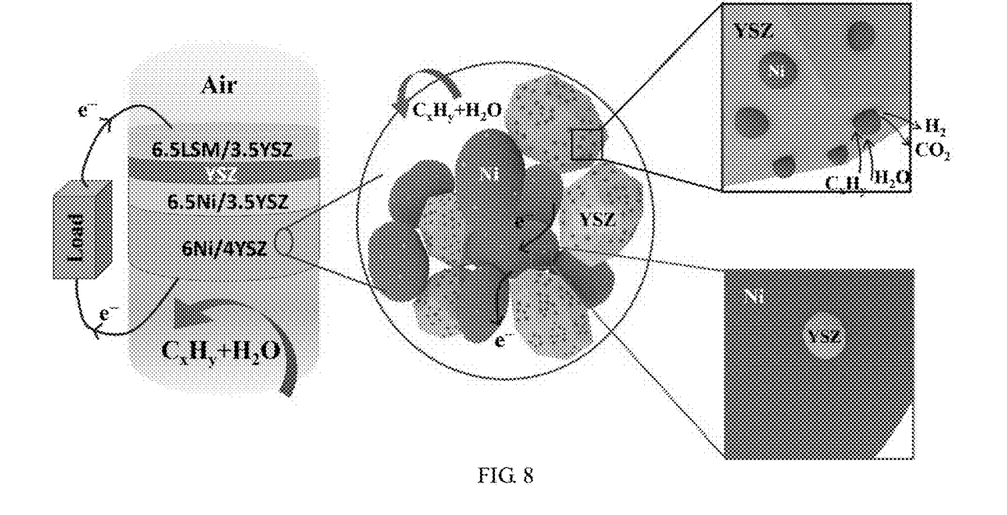
FIG. 8 is the schematic diagram showing the anti-coking mechanism of the SOFC anode.
Figure 9:
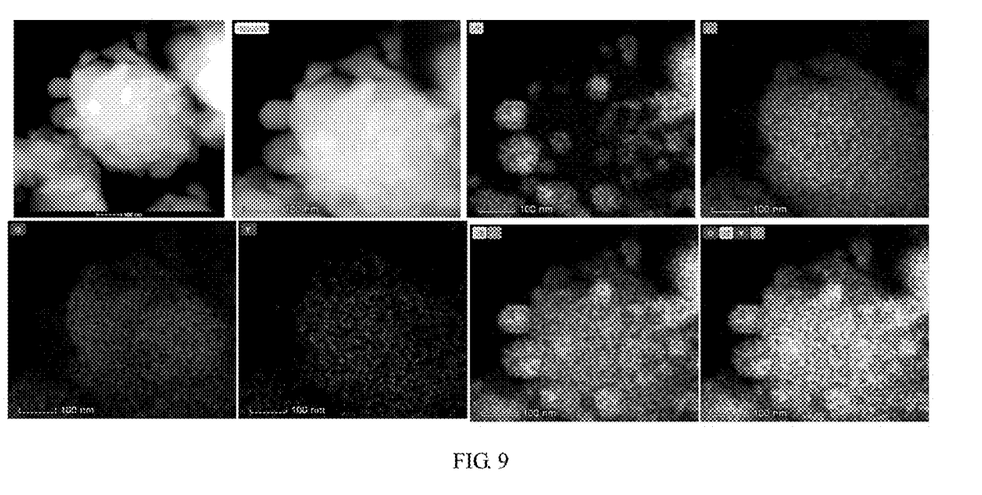
FIG. 9 are the high-angle annular dark field (HAADF) and corresponding EDS images of Ni nanoparticles precipitated on the surface of 5YSZ particles.

The anode supporting layer is made of NiO powder (Inco Co. Ltd., Grade A) with a crystallite size of about 10 nm and 5YSZ powder (Jiujiang Farmeiya Co. Ltd., YSZ-F-DM-5.0) with $D_{50}$ of 0.53 μm, which are mixed according to the weight ratio of NiO:5YSZ=60:40. The zirconia ball with a diameter of 0.6~0.8 mm is used for ball-milling with anhydrous ethanol as the medium and triethanolamine as the dispersant according to the weight ratio of powder:ball:ethanol:dispersant=1:1.8:0.6:0.04. Ball-milling is performed at 400 rpm for 4 hours in a planetary ball mill. The ball-milled powder is dried at 80° C. and then calcined at 800° C. for 2 hours. The calcined powder is ball-milled at 400 rpm for 2 hours in a planetary ball mill, and then the ball-milled powder is dried at 80° C. for spare. FIG. 7 is the particle size distribution curves of NiO-5YSZ after ball-milling, calcined and again ball-milled. As shown in FIG. 7, the particle size distribution range of the anode supporting layer powder after processing, compared to the original powder, becomes narrower to be 0.1~1.1 μm with the lower of $D_{50}$=0.190 μm, showing a bimodal distribution. The particle size and distribution range of the powder after processing is more suitable for the preparation of SOFC anodes and tape-casting process. FIG. 9 are the high-angle annular dark field (HAADF) and corresponding EDS images of Ni nanoparticles precipitated on the surface of 5YSZ particles from the anode supporting layer powder prepared by ball-milling, calcining, again ball-milling and reduction under a hydrogen atmosphere at 900° C. for 4 hours. The EDS images are six elemental mapping images of Ni, Zr, O, Y, Ni+Zr and Ni+Zr+O+Y The figure may further prove that many Ni metal nanoparticles are precipitated on the surface of the sub-micron 5YSZ powder particles.

The anode functional layer is made of NiO (Inco Co. Ltd., Grade A) powder with a crystallite size of about 10 nm and 8YSZ (Tosoh Co. Ltd., TZ-8YS) powder with a $D_{50}$ of 90 nm, which are mixed according to the weight ratio of NiO:8YSZ=65:35. The treatment process the powder is the same as that of the anode supporting layer powder for spare.

Figure 2A:
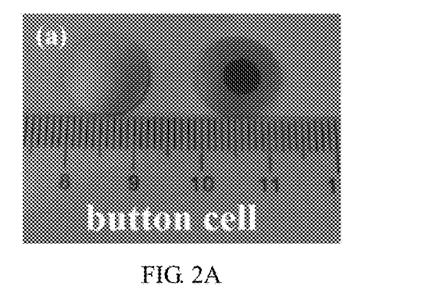
FIG. 2A is the physical photograph of SOFC button full cell with the diameter of 12 mm and the thickness of 0.55 mm prepared and tested in a specific embodiment of the present disclosure.
Figure 2B:
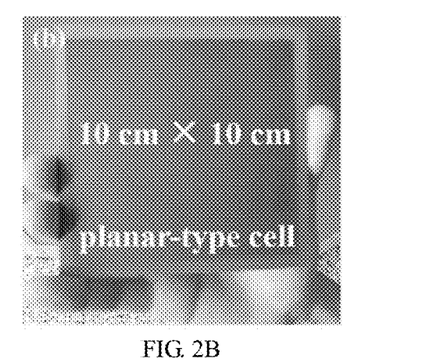
FIG. 2B is the physical photograph of planar-type SOFC full cell with the area of 100×100×0.55 mm3.
Figure 2C:
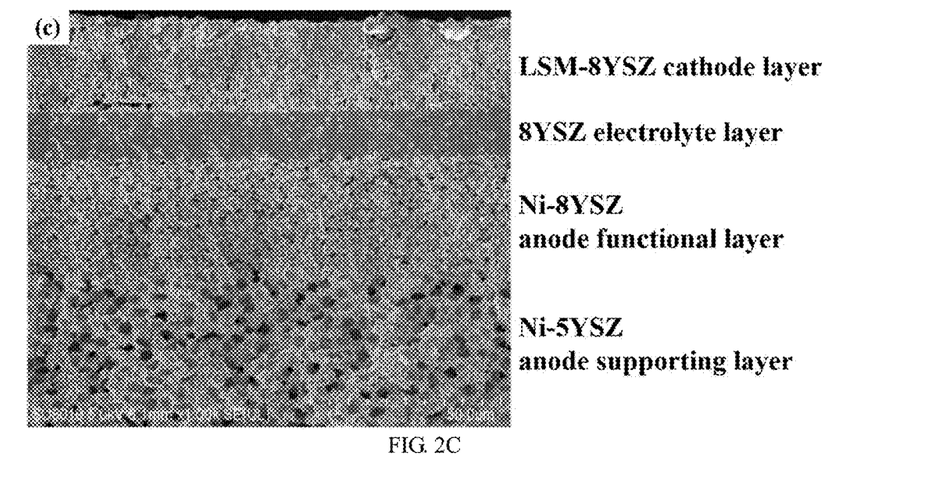
FIG. 2C is the microstructural cross-sectional SEM image of SOFC button full cell after reduction.

The above-mentioned processed anode supporting layer powder and anode functional layer powder is formed by a tape-casting method, and YSZ electrolyte sheet is tape-casted. The electrolyte/functional anode sheet is prepared by a double-layer tape-casting method. Three sheets are laminated by hot pressing at 100° C. for 15 minutes under 15 MPa, to obtain a sheet of anode-supported electrolyte film (from top to bottom: electrolyte layer+anode functional layer+anode supporting layer). After cutting a certain size and then sintering at 1400° C. for 3 hours, a half-cell is obtained. The planar-type anode-supported half-cell with the area of 100×100×0.55 mm$^3$ could be prepared. In a specific embodiment of the present disclosure, the button full cell with the diameter of 12 mm and the thickness of 0.55 mm is obtained after a round green sheet with a diameter of 15 mm being sintered. These half-cells are further printed with a cathode slurry (LSM-8YSZ, a mixture of lanthanum strontium manganate and 8YSZ, a mass ratio of LSM:8YSZ=6:4). The full cells are obtained by calcining the cathode at 1100~1200° C., and the thickness of the cathode is 20 μm, which is a porous structure with a porosity of 33 vol. %. Finally, the button full cell in FIG. 2A for electrochemical testing and the planar-type full cell in FIG. 2B are obtained. After completing the cell preparation, the electrochemical performance testing and long-term stability testing of the cell are carried out. The specific structure and performance of the cell are as follows:

Cell Structure:

FIG. 2C is a microstructural SEM image of the SOFC full cell after reduction, including the cathode, electrolyte and anode, where the anode includes an anode functional layer and an anode supporting layer. The electrolyte is a densely burned thin layer with a thickness of 10 μm. The cathode is a porous structure with a thickness of 20 μm. The anode consists of an anode functional layer with small holes and an anode supporting layer with larger holes. The thickness of the functional layer is 23 μm, and the supporting layer 450 μm.

Figure 3A:
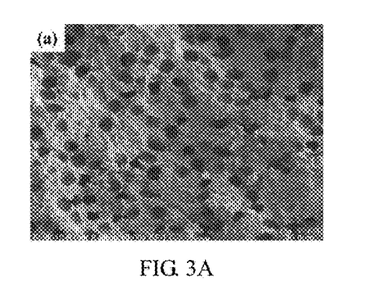
FIGS. 3A-3B are the cross-sectional SEM comparison images of the anode supporting layer in the cell before reduction. The reduction condition is operated at the discharging current of 0.1 A with 97 vol. % $H_2$+3 vol. % $H_2O$ as fuel at 750° C. for 6 hours.
Figure 3B:
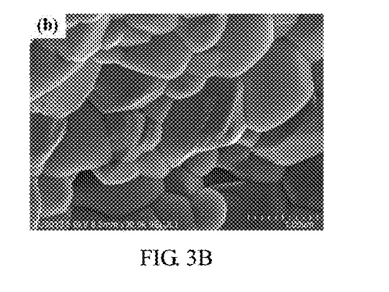
Figure 3C:
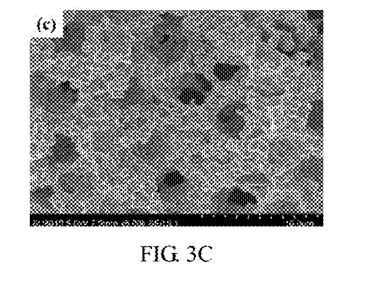
FIGS. 3C-3E are the cross-sectional SEM comparison images of the anode supporting layer in the cell after reduction. The reduction condition is operated at the discharging current of 0.1 A with 97 vol. % $H_2$+3 vol. % $H_2O$ as fuel at 750° C. for 6 hours.
Figure 3D:
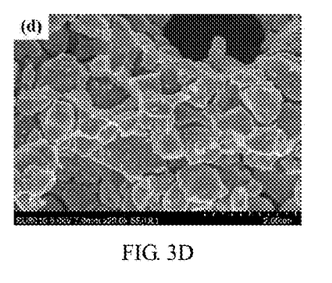
Figure 3E:
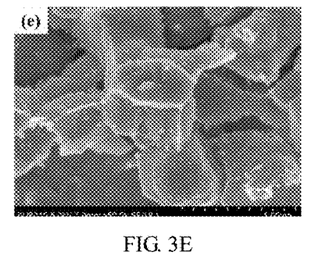

FIGS. 3A-3E are the cross-sectional SEM images of the anode supporting layer in the cell before and after reduction. Among them, FIGS. 3A-3B are the cross-sectional SEM images of the anode supporting layer in the cell before reduction, which could show that the anode has a porous structure and the size of the holes is mainly about 5 μm, and no small nanocrystals precipitated on the surface of the crystal grains. FIGS. 3C-3E are the cross-sectional SEM images of the anode supporting layer in the single cell after reduction, which could show that the anode has a porous structure and the size of the holes is mainly about 5 μm, and some small nanocrystals have been observed to be precipitated on the surface of the crystal grains. FIGS. 3D-3E are partially enlarged views, obviously, there are many nanocrystals precipitated on the surface of nickel oxide and zirconia grains. The grains with clear angular shape are 5YSZ grains, and the grains with a nearly spherical shape are Ni metal grains. The nanocrystals precipitated from the 5YSZ grains are relatively obvious; the nanocrystals precipitated from the Ni metal grains are less obvious, and the precipitated nanocrystals are smaller. Some surfaces do not show any precipitation, as these surfaces are newly fractured surfaces. The reduction condition of the single cell is operated at the discharging current of 0.1 A with 97 vol. % $H_2$+3 vol. % $H_2O$ as fuel at 750° C. for 6 hours.

Figure 4A:
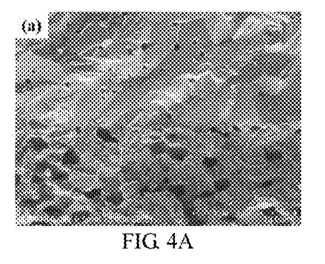
FIGS. 4A-4B are the cross-sectional SEM comparison images of the anode functional layer in the cell before reduction. The reduction condition is operated at the discharging current of 0.1 A with 97 vol. % $H_2$+3 vol. % $H_2O$ as fuel at 750° C. for 6 hours.
Figure 4B:
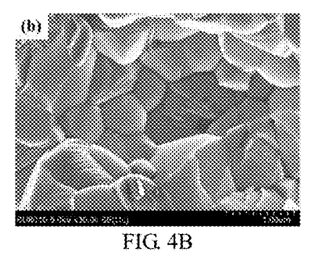
Figure 4C:
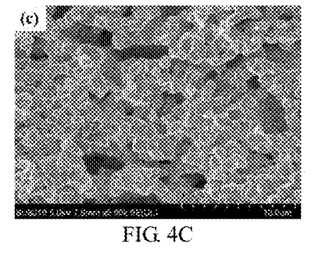
FIGS. 4C-4E are the cross-sectional SEM comparison images of the anode functional layer in the cell after reduction. The reduction condition is operated at the discharging current of 0.1 A with 97 vol. % $H_2$+3 vol. % $H_2O$ as fuel at 750° C. for 6 hours.
Figure 4D:
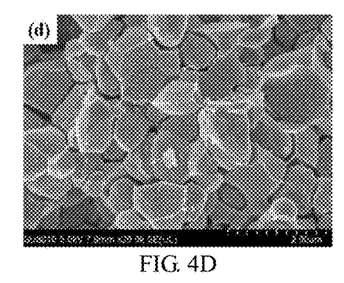
Figure 4E:
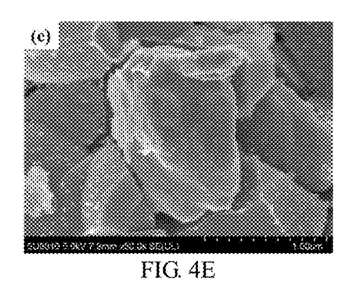

FIGS. 4A-4E are the SEM comparison images before and after reduction (discharging) of the anode functional layer in the single cell. FIGS. 4A-4B are the cross-sectional SEM images of the anode functional layer before reduction, which could show that the anode functional layer has a porous structure, the size of the holes is mainly about 1.8 μm, and the functional layer is closely combined with the electrolyte. No small nanocrystals have been observed to be precipitated on the surface of the crystal grains in the anode functional layer before reduction (discharging). FIGS. 4C-4E are the cross-sectional SEM images of the anode functional layer after reduction, obviously, there are many nanocrystals precipitated on the surface of nickel and zirconia grains. The grains with clear angular shapes are 8YSZ grains, and the grains with a nearly spherical shape are Ni metal grains. The nanocrystals precipitated on the 8YSZ grains are relatively obvious; the nanocrystals precipitated from the metal Ni grains are less obvious, and the precipitated nanocrystals are smaller. Some surfaces do not show any precipitation, as these surfaces are newly fractured surfaces.

Figure 5A:
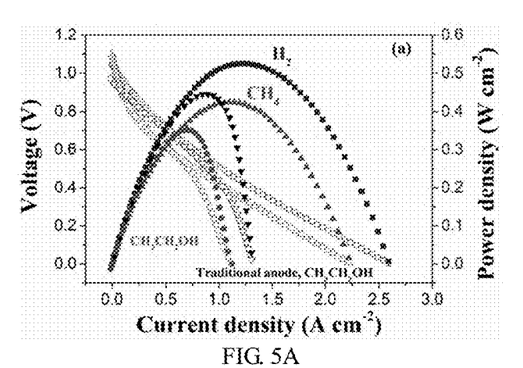
FIG. 5A shows the current density versus voltage (I-V) and current density versus power density (I-P) curves.
Figure 5B:
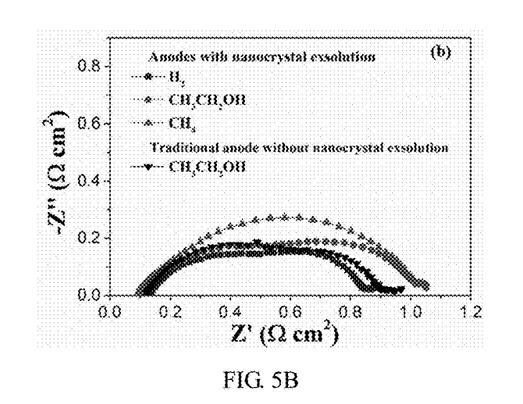
FIG. 5B shows electrochemical impedance spectrum (EIS) curves of the single cell under three fuels of 97 vol. % $H_2$+3 vol. % $H_2O$, 97 vol. % $CH_4$+3 vol. % $H_2O$ and 92 vol. % $N_2$+8 vol. % $CH_3CH_2OH$ at 750° C., and the cell with the traditional anode under 92 vol. % $N_2$+8 vol. % $CH_3CH_2OH$ at 750° C., respectively.

Cell Performance:

The cell prepared in embodiment 1 is further tested for electrochemical performance in FIGS. 5A-5B. FIG. 5A shows the current density versus voltage (I-V) and current density versus power density (I-P) curves, and FIG. 5B shows the electrochemical impedance spectrum (EIS) curves of the single cell under three fuels of 97 vol. % $H_2$+3 vol. % $H_2O$, 97 vol. % $CH_4$+3 vol. % $H_2O$ and 92 vol. % $N_2$+8 vol. % $CH_3CH_2OH$ at 750° C., and the cell with the traditional anode under 92 vol. % $N_2$+8 vol. % $CH_3CH_2OH$ at 750° C., respectively. Note: except for the two-phase mutual solid solution treatment, the preparation method and the component formulas of the cell with the traditional anode are consistent with the cell with the anti-coking anode in a specific embodiment of the present disclosure. As seen from the figure, under $H_2$ and $CH_4$ as fuels with 30 mL/min and air as oxidizing gas (static) at 750° C., the open circuit voltage is 1.05 and 1.10 V, the maximum power density of the cell is 0.52 and 0.43 W/cm$^2$, the total impedance is 0.89 and 1.03 Ω·cm$^2$, the ohmic impedance and bipolar impedance are 0.14+0.75 Ω·cm$^2$ and 0.10+0.93 Ω·cm$^2$, respectively. In addition, using wet ethanol as the fuel ($N_2$ gas passes through ethanol liquid with the flow rate of 30 mL/min; ethanol molecules are brought into the anode, where $N_2$ content is 92 vol. % and ethanol content is 8 vol. %) and air as the oxidant (static), the electrochemical performance of the cell with traditional anode and the cell with anti-coking anode are also tested, which show that the open circuit voltage is 0.95 and 0.98 V, the maximum power density of the cell is 0.45 and 0.35 W/cm$^2$ the total impedance is 0.97 and 1.05 Ω·cm$^2$, the ohmic impedance and bipolar impedance are 0.12+0.85 Ω·cm$^2$ and 0.10+0.95 Ω·cm$^2$, respectively.

Figure 6:
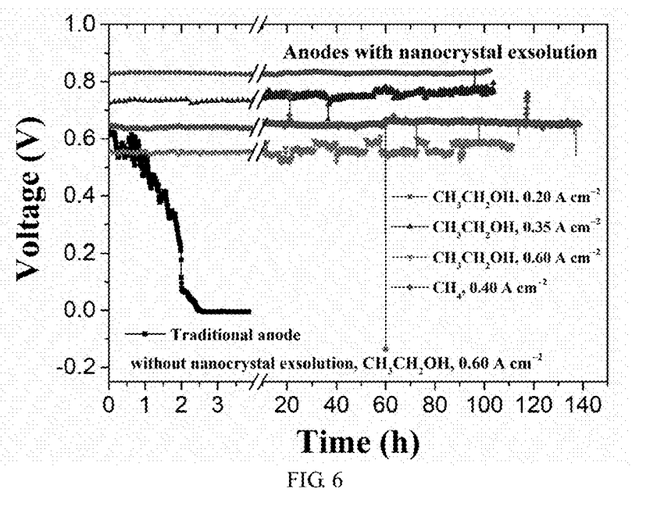
FIG. 6 are the discharge curves of the single cell under two fuels of 97 vol. % $CH_4$+3 vol. % $H_2O$ and 92 vol. % $N_2$+8 vol. % $CH_3CH_2OH$ at 750° C., and the cell with the traditional anode under 92 vol. % $N_2$+8 vol. % $CH_3CH_2OH$ at 750° C., respectively.

FIG. 6 are the discharge curves of the single cell under two fuels of 97 vol. % $CH_4$+3 vol. % $H_2O$ and 92 vol. % $N_2$+8 vol. % $CH_3CH_2OH$ at 750° C., and the cell with the traditional anode under 92 vol. % $N_2$+8 vol. % $CH_3CH_2OH$ at 750° C., respectively. As seen from the figure, under alcohol as fuels, the cell has no degradation after 100 h operation at the discharging current density of 0.20, 0.35 and 0.60 A/cm$^2$. However, the cell using traditional anode without nanocrystal exsolution has obvious degradation at the discharging current density of 0.60 A/cm$^2$, and the terminal voltage is decreased down to 0 V only after 2.5 hours. When using $CH_4$ as fuel, after the single cell operates for about 8 hours, the ventilation is turned off and the voltage rises (possibly results from the slight increase of oxygen concentration in the air). After 60 hours of operation, $CH_4$ no longer passes through the water. In the subsequent 80 hours of operation, the fuel is dry $CH_4$ and the increase in methane concentration result in a rise in voltage. As can be seen from the figure, when the cell uses wet methane at the beginning and dry methane in the later stage, no carbon deposition occurs on the cell, and the cell may stably output for a long time.

As mentioned above, the present disclosure effectively overcomes various shortcomings in the existing technology and has the high industrial utilization value.

The above-mentioned embodiments are just used for exemplarily describing the principle and effects of the present disclosure instead of limiting the present disclosure. Modifications or variations of the above-described embodiments may be made by those skilled in the art without departing from the spirit and scope of the disclosure. Therefore, all equivalent modifications or changes made by those who have common knowledge in the art without departing from the spirit and technical concept disclosed by the present disclosure shall be still covered by the claims of the present disclosure.

The invention claimed is:

1. An anode-reduced SOFC single cell with anti-coking property, obtained from a SOFC single cell after reduction treatment and/or discharging treatment, where the SOFC single cell comprises an anode material layer, an electrolyte layer, and a cathode material layer, and the anode material layer is prepared from a NiO/YSZ anode material, wherein the NiO/YSZ anode material is prepared by:

(1) providing a mixed powder of NiO and YSZ, wherein a particle size of a YSZ raw material in the mixed powder is $D_{50}$=50~1000 nm, and a crystallite size of a NiO raw material in the mixed powder is 10~20 nm;
(2) subjecting the mixed powder provided in step (1) to two-phase mutual solid solution treatment, in which NiO nanoparticles adsorbed around YSZ particles are solid-dissolved into a YSZ lattice to form a solid solution, and YSZ nanoparticles adsorbed around NiO particles are solid-dissolved into a NiO lattice to form a solid solution;
(3) adjusting a particle size of a product obtained in the solid solution treatment in step (2).

2. The anode-reduced SOFC single cell with anti-coking property according to claim 1, the mixed powder of NiO and YSZ is pulverized after the NiO and YSZ raw materials being mixed;
and/or, in the step (1), a weight ratio of NiO and YSZ is 1~1.8:1.

3. The anode-reduced SOFC single cell with anti-coking property according to claim 2, wherein in the step (1), NiO and YSZ are pulverized and mixed by ball-milling; a powder obtained by ball milling is further dried with a drying temperature of 60~80° C.;
and/or, in the step (1), the pulverization and mixing are performed in a presence of dispersants; a weight ratio of the powder and the dispersant is 1:0.005~0.1;
and/or, in the step (1), the pulverization and mixing are performed in a presence of solvents; a weight ratio of the powder and the solvent is 1:0.2~1.5.

4. The anode-reduced SOFC single cell with anti-coking property according to claim 3, wherein in the step (1), the ball-milling is a wet ball-milling;
and/or, in the step (1), the dispersants are selected from a group consisting of triethanolamine, citric acid, polyethylene glycol, acetylacetone, polyvinylpyrrolidone and polyacrylic acid, or combinations thereof; the weight ratio of the powder and the dispersant is 1:0.02~0.05;
and/or, in the step (1), the solvents are selected from a group consisting of anhydrous ethanol, acetone, butanone, isopropyl alcohol and dimethylformamide, or combinations thereof; the weight ratio of the powder and the solvent is 1:0.4~0.8.

5. The anode-reduced SOFC single cell with anti-coking property according to claim 1, wherein in the step (2), a specific method for subjecting the mixed powder provided in the step (1) to two-phase mutual solid solution treatment is drying and calcining the mixed powder provided in the step (1);
and/or, in the step (2), a calcination temperature is 600~1200° C.;
and/or, in the step (2), a calcination time is 1~10 hours.

6. The anode-reduced SOFC single cell with anti-coking property according to claim 5, wherein in the step (2), the calcination temperature is 800~950° C.;
and/or, in the step (2), the calcination time is 2~8 hours.

7. The anode-reduced SOFC single cell with anti-coking property according to claim 1, wherein in the step (3), a specific method for adjusting the particle size of the product obtained in the solid solution treatment in the step (2) is pulverizing and drying the calcined product provided in the step (2).

8. The anode-reduced SOFC single cell with anti-coking property according to claim 7, wherein in the step (3), the calcined product provided in the step (2) is pulverized by ball-milling.

9. The anode-reduced SOFC single cell with anti-coking property according to claim 1, wherein the anode material layer comprises an anode supporting layer and/or an anode functional layer, and the anode supporting layer and/or the anode functional layer are prepared from the NiO/YSZ anode material.

10. The anode-reduced SOFC single cell with anti-coking property according to claim 9, wherein a thickness of the anode supporting layer is 300~700 μm, a pore size is 3~10 μm, and a porosity of the anode support layer after reduction is 25~40 vol. %; a thickness of the anode functional layer is 5~30 μm, a pore size is 1~5 μm, and a porosity of the anode functional layer after reduction is 25~40 vol. %;

and/or, the electrolyte layer is selected from a YSZ electrolyte layer with a thickness of 2~10 μm;

and/or, the cathode material layer is selected from a combination of LSM and YSZ, a combination of LSM and SSZ, or a combination of LSCF and GDC, wherein a weight ratio of LSM to YSZ, LSM to SSZ, and LSCF to GDC is 5~7:5~3;

and/or, a thickness of the cathode material layer is 20~40 μm, the cathode material layer has a porous structure with a porosity of 25~40 vol. %.

11. The anode-reduced SOFC single cell with anti-coking property according to claim 10, wherein the thickness of the anode supporting layer is 400~500 μm; and the porosity of the anode support layer after reduction is 30~35 vol. %; the thickness of the anode functional layer is 5~10 μm, and the porosity of the anode functional layer after reduction is 30~35 vol. %;

and/or, the thickness of the cathode material layer is 20~25 μm, the cathode material layer has a porous structure with the porosity of 30~35 vol. %.

* * * * *